US010404140B2

(12) United States Patent
Moon et al.

(10) Patent No.: US 10,404,140 B2
(45) Date of Patent: Sep. 3, 2019

(54) COOLING STRUCTURE OF DRIVE MOTOR

(71) Applicant: Hyundai Motor Company, Seoul (KR)

(72) Inventors: Sanghoon Moon, Yongin-si (KR); Yeonho Kim, Suwon-si (KR); WoongChan Chae, Gwangmyeong-si (KR); YoungJin Shin, Changwon-si (KR); Hyoungjun Cho, Suwon-si (KR); Jung Shik Kim, Seoul (KR)

(73) Assignee: Hyundai Motor Company, Seoul (KR)

( * ) Notice: Subject to any disclaimer, the term of this patent is extended or adjusted under 35 U.S.C. 154(b) by 353 days.

(21) Appl. No.: 15/373,946

(22) Filed: Dec. 9, 2016

(65) Prior Publication Data
US 2018/0115219 A1    Apr. 26, 2018

(30) Foreign Application Priority Data
Oct. 24, 2016   (KR) .................. 10-2016-0138366

(51) Int. Cl.
   H02K 9/19       (2006.01)
   H02K 1/18       (2006.01)
   H02K 9/00       (2006.01)
   H02K 9/193      (2006.01)

(52) U.S. Cl.
   CPC .............. *H02K 9/19* (2013.01); *H02K 1/18* (2013.01); *H02K 9/005* (2013.01); *H02K 9/193* (2013.01)

(58) Field of Classification Search
   USPC ................................................... 310/52–54
   See application file for complete search history.

(56) References Cited

U.S. PATENT DOCUMENTS

| 5,718,302 A | 2/1998 | Hasebe et al. | |
|---|---|---|---|
| 8,446,056 B2* | 5/2013 | Bradfield | H02K 1/185 310/54 |
| 8,720,623 B1* | 5/2014 | Kim | B60K 17/043 180/65.51 |
| 2012/0091833 A1* | 4/2012 | Hackett | H02K 1/32 310/53 |
| 2012/0104884 A1* | 5/2012 | Wagner | H02K 1/32 310/54 |
| 2014/0167535 A1* | 6/2014 | Han | H02K 5/20 310/52 |
| 2014/0217843 A1* | 8/2014 | Suh | H02K 3/527 310/57 |

FOREIGN PATENT DOCUMENTS

| JP | 2011-101513 A | 5/2011 |
|---|---|---|
| JP | 2011-188686 A | 9/2011 |
| JP | 5445675 B2 | 3/2014 |
| JP | 2014-204546 A | 10/2014 |
| KR | 10-2013-0117777 A | 10/2013 |

* cited by examiner

*Primary Examiner* — Gary A Nash
(74) *Attorney, Agent, or Firm* — Morgan, Lewis & Bockius LLP

(57) ABSTRACT

A cooling structure of a drive motor may include a ring-shaped support member disposed on the inside of a housing and supporting the stator core of the drive motor, in which the support member may have a channel for cooling oil flow therein and nozzle openings for spraying the cooling oil to the stator core and a stator coil wounded around the stator core.

10 Claims, 4 Drawing Sheets

COOLING STRUCTURE OF DRIVE MOTOR

CROSS-REFERENCE TO RELATED APPLICATION

The present application claims priority to Korean Patent Application No. 10-2016-0138366 filed on Oct. 24, 2016, the entire contents of which is incorporated herein for all purposes by this reference.

BACKGROUND OF THE INVENTION

Field of the Invention

The present invention relates to a drive motor of an environmentally-friendly vehicle, and more particularly, to a cooling structure of a drive motor for cooling heat that is generated by the drive motor.

Description of Related Art

In general, hybrid vehicles or electric vehicles, which are usually called environmentally-friendly vehicles, can be driven by an electric motor (hereafter, also referred to as a "drive motor") acquiring torque from electric energy of a battery.

The drive motor includes a stator and a rotor, in which the stator is disposed in a motor housing and the rotor is disposed at a side of the stator with a gap therebetween. The stator includes a stator core that is an electric steel plate and a coil wound around the stator core.

Meanwhile, the drive motor generates a large amount of heat depending on the current applied to the coil of the stator. Accordingly, cooling is necessary for preventing damage and deterioration of efficiency of the driving motor due to heat and continuously securing stable operation of the drive motor.

In particular, cooling a drive motor such as a permanent magnet synchronous motor (PMSM) is very important in terms of efficiency of the motor and protection of main parts (a permanent magnet, a coil, etc.). Cooling a drive motor is an important factor that determines the performance and efficiency of a drive motor. That is, the permanent magnet and the coil in a drive motor may influence the performance of the motor, depending on temperature.

As methods of cooling drive motors, there are an oil cooling type that uses transmission oil (ATF) and a water cooling type that uses cooling water. For example, according to a structure for cooling a drive motor using the oil cooling type, a stator core is fixed to a motor housing and also a support ring for cooling the stator core is disposed between the stator core and the motor housing.

Accordingly, heat generated from the drive motor transfers to the support ring through the stator core and is dissipated through the support ring. According to the structure for cooling a drive motor, oil flows through a channel in the support ring, where it is possible to cool a drive motor with a maximum amount of heat that is dissipated through the support ring.

However, according to the structure for cooling a drive motor using the oil cooling type, since a drive motor is indirectly cooled by the oil flowing through the channel in the support ring, there is a limit in improving the performance of cooling a drive motor.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a cooling apparatus of a drive motor, the structure being capable of improving performance of cooling a drive motor by directly supplying oil, which flows through a channel in a support ring, to the drive motor.

aspects of the present invention are directed to providing a cooling apparatus of a drive motor including: a ring-shaped support member disposed on the inside of a housing and supporting the stator core of the drive motor, in which the support member may have a channel for cooling oil flow therein and nozzle holes for spraying the cooling oil to the stator core and a stator coil wounded around the stator core.

The nozzle holes may be formed toward the both sides of the stator core in the channel.

The nozzle holes may be formed at a portion connecting the inside surface and both sides of the support member, respectively, and circumferentially spaced from each other with regular intervals.

The nozzle holes may be inclined toward both sides of the stator core at the portion connecting the inside surface and both sides of the support member.

Another exemplary embodiment of the present invention provides a cooling structure of a drive motor including: a ring-shaped support member disposed on the inside of a housing and supporting the stator core of the drive motor, in which the support member may have a channel for cooling oil flow therein and nozzle holes for spraying the cooling oil to the stator core and a stator coil wounded around the stator core, and a guide formed on a bobbin supporting the stator coil and guiding the cooling oil sprayed from the nozzle holes to the stator coil.

The guide may have a blocking portion disposed adjacent to the nozzle holes of the support member and blocking the cooling oil sprayed from the nozzle holes, and a guiding portion integrally connected to the blocking portion and guiding the cooling oil blocked by the blocking portion to the stator coil.

The guide may have an L-shaped cross-section.

The guiding portion may be horizontally connected to the body of the bobbin, and the blocking portion may be vertically connected to the guiding portion.

The guiding portion may have a curved guiding surface for guiding the cooling oil blocked by the blocking portion to the stator coil.

The guiding portion may have a guiding hole exposing the stator coil and guiding the cooling oil to the stator coil.

According to an exemplary embodiment of the present invention, since the cooling oil flowing through the channel of the support member is supplied to the stator through the nozzle holes of the support member and the guide of the bobbin, and the stator core and the stator coil of the stator can be directly cooled by the cooling oil, so it is possible to more efficiently cool the drive motor.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
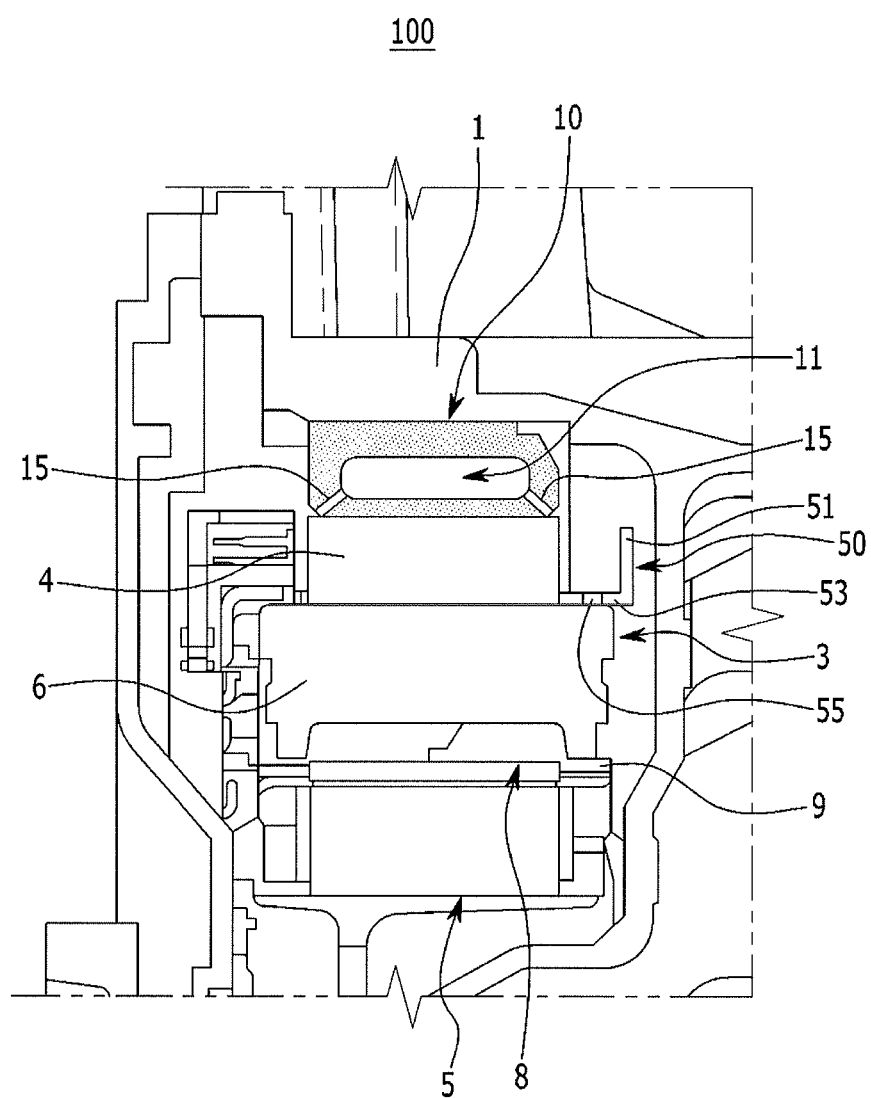
FIG. 1 is a view showing a cooling structure of a drive motor according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Configurations irrelevant to description are omitted to clearly describe the present invention and like reference numerals designate like elements throughout the specification.

Further, the sizes and thicknesses of the configurations shown in the drawings are provided selectively for the convenience of description, so that the present invention is not limited to those shown in the drawings and the thicknesses are exaggerated to make some parts and regions clear.

Discriminating the names of components with the first, and the second, etc. in the following description is for discriminating them for the same relationship of the components and the components are not limited to the order in the following description.

Throughout the specification, unless explicitly described to the contrary, the word "comprise" and variations such as "comprises" or "comprising", will be understood to imply the inclusion of stated elements but not the exclusion of any other elements.

Further, the terms, " . . . unit", " . . . mechanism", " . . . portion", " . . . member" etc. used herein mean the units of inclusive components performing at least one or more functions or operations.

FIG. 1 is a view showing a cooling structure of a drive motor according to an exemplary embodiment of the present invention.

Referring FIG. 1, an exemplary embodiment of the present invention can be applied to a drive motor for an electric vehicle or a hybrid vehicle (for example, an HEV or a PHEV). For example, the drive motor may be a drive motor that is fixed to an automatic transmission for a hybrid vehicle.

For example, the drive motor according to an exemplary embodiment of the present invention may be a Permanent magnet synchronous motor (PMSM) or a Wound Rotor Synchronous Motor (WRSM).

The drive motor includes a stator 3 fixed in a housing 1 and generating magnetic flux and a rotor 5 disposed at a predetermined distance from the stator 3 and rotating with a rotary shaft that is a drive shaft. The housing 1 may be a transmission housing or a motor housing.

For example, the drive motor may be an interior rotor type synchronous motor in which the rotor 5 is disposed inside the stator 3. A concentrated type stator coil 6 is wound on a stator core 4 of the stator 3 and a bobbin 8 is disposed to support the stator coil 6.

A cooling structure 100 according to an exemplary embodiment of the present invention for the drive motor is configured to dissipate heat transferring from the stator coil 6 to the housing 1, using a cooling medium (for example, transmission oil) (hereafter, referred to as "cooling oil").

Further, v aspects of the present invention are directed to providing a cooling structure 100 of a drive motor that can improve performance of cooling the drive motor by directly supplying cooling oil to the stator 3 of the drive motor.

To this end, the cooling structure 100 of a drive motor according to an exemplary embodiment of the present invention basically includes a support member 10 that is disposed on the inside of the housing 1 and supports the stator core 4.

Figure 2:
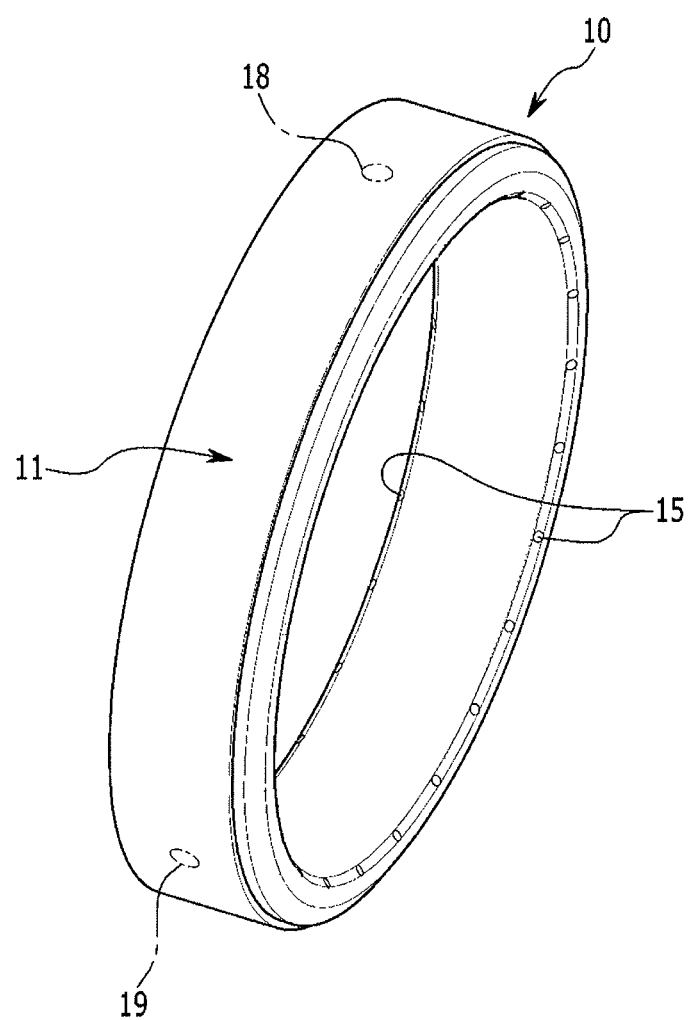
FIG. 2 is a view showing a support member in the cooling structure of a drive motor according to an exemplary embodiment of the present invention.

FIG. 2 is a view showing a support member in the cooling structure of a drive motor according to an exemplary embodiment of the present invention.

Referring to FIG. 1 and FIG. 2, in an exemplary embodiment of the present invention, the support member 10 is a support ring having a generally ring shape. The support member 10 has an inside surface and an outside surface and has two sides connecting the inside surface and an outside surface. The support member 10 may include stainless steel having a coefficient of thermal expansion that is similar to that of the stator core 4.

For example, the support member 10 may be fitted on the inside of the housing 1 and the stator core 4 may be thermally fitted inside the support member 10 and fixed to the inside surface of the support member 10 by shrink-fitting.

As described above, since the stator core 4 is shrink-fitted inside the support member 10 having a coefficient of thermal expansion similar to that of the stator core 4, it is possible to improve assembly stability of the stator core 4 and reduce operational noise and vibration of the drive motor, even when the temperature of the stator core 4 increases when the drive motor operates.

Meanwhile, in an exemplary embodiment of the present invention, the support member 10 forms an oil channel 11 (hereafter, referred to as a "channel" for the convenience of description) for passing cooling oil that is a cooling medium for cooling the stator core 4. The channel 11 is integrally formed in the support member 10.

The support member 10 is manufactured by core type low-pressure molding and the channel 11 may be integrally formed inside the support member 10. That is, since the support member 10 is formed into a ring-shaped body by low-pressure molding, the channel 11 may be a ring-shaped space in the ring-shaped body of the support member 10.

In an exemplary embodiment of the present invention, the support member 10 has nozzle holes 15 for directly supplying some of the cooling oil, which flows through the channel 11, to the stator 3 of the drive motor. The nozzle holes 15 spray the cooling oil flowing through the channel 11 to the stator core 4 and the stator coil 6 wound around the stator core 4. The cooling oil is kept in an oil pan and supplied to the channel 11 of the support member 10 by an oil pump. The cooling oil is discharged through the channel 11 by the pressure from the oil pump and then flows back into the oil pan.

The nozzle holes 15 are connected to the channel 11 and face the stator core 4 in the channel 11. The nozzle holes 15 are formed at the portion connecting the inside surface and both sides of the support member 10, respectively, and circumferentially spaced from each other with regular intervals.

The nozzle holes 15 are inclined toward both sides of the stator core 4 at the portion connecting the inside surface and both sides of the support member 10. The cooling oil flowing through the channel 11 is sprayed to the stator core 4 and the stator coil 6 through the nozzle holes 15.

Reference numeral '18' not stated above indicates an inlet for the cooling oil to flow into the channel 11 of the support member 10 and reference numeral '19' indicates an outlet for the cooling oil to flows outside from the channel 11.

On the other hand, in an exemplary embodiment of the present invention, as shown in FIG. 1, there is provided a guide 50 that is formed on the bobbin 8 supporting the stator coil 6 of the stator 3 and guides the cooling oil sprayed from the nozzle holes 15 of the support member 10 to the stator coil 6.

Figure 3:
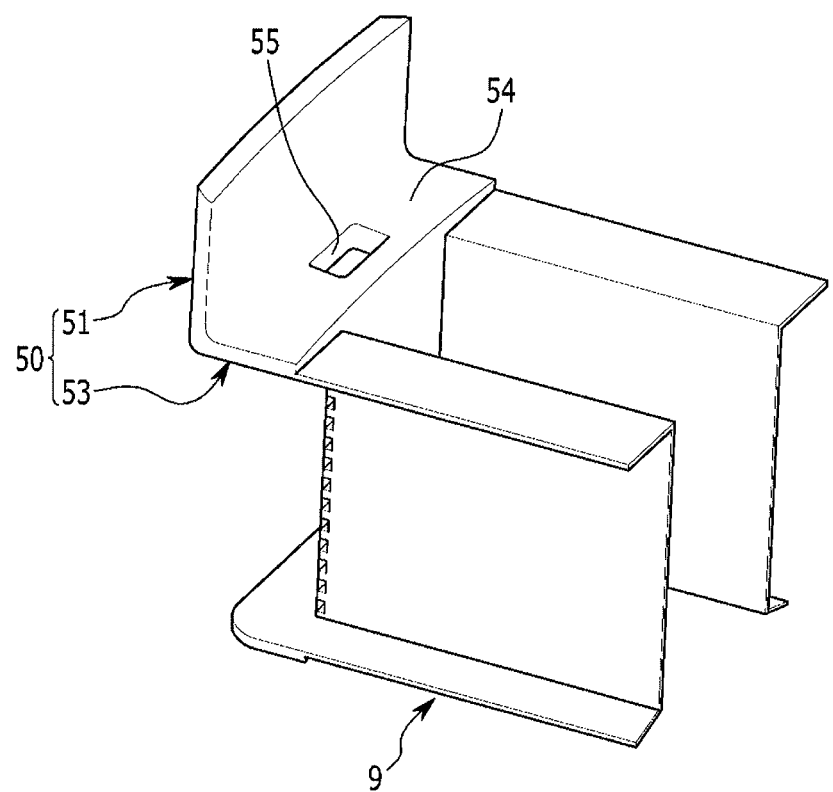
FIG. 3 is a view showing a bobbin in the cooling structure of a drive motor according to an exemplary embodiment of the present invention.

FIG. 3 is a view showing a bobbin in the cooling structure of a drive motor according to an exemplary embodiment of the present invention.

Referring to FIGS. 1 and 3, in an exemplary embodiment of the present invention, the guide 50 is integrated with the bobbin 8, adjacent to the nozzle holes 15 of the support member 10. The bobbin 8, which supports the stator coil 6 wound around the stator core 3, includes an insulating material and has a bobbin body 9 that, for example, has a U-shaped cross-section.

The guide 50 has a blocking portion 51 and a guiding portion 53, integrally. The blocking portion 51 is disposed adjacent to the nozzle holes 15 of the support member 10 to block the cooling oil sprayed from the nozzle holes 15.

Further, the guiding portion 53 is integrally formed with the bobbin body 9 and integrally connected to the blocking portion 51. The guiding portion 53 guides the cooling oil blocked by the blocking portion 51 to the stator coil 6.

The guiding portion 53 has a curved guiding surface 54 for guiding the cooling oil flowing down on and blocked by the blocking portion 51 to both sides of the stator coil 6. The guiding surface 54 is curved toward the center from both edge portions of the guiding portion 53.

Further, the guiding portion 53 has a guiding hole 55 for guiding the cooling oil flowing down on and blocked by the blocking portion 51 directly to the stator core 6. The guiding hole 55 is formed at the center of the guiding portion 53 and exposes the stator coil 6.

The guide 50 having the blocking portion 51 and the guiding portion 53 has an L-shaped cross-section, in which the guiding portion 53 is horizontally connected to the bobbin body 9 and the blocking portion 51 is vertically connected to the guiding portion 53.

The operation of the cooling structure 100 of a drive motor according to an exemplary embodiment of the present invention is described hereafter with reference to the drawings.

Figure 4:
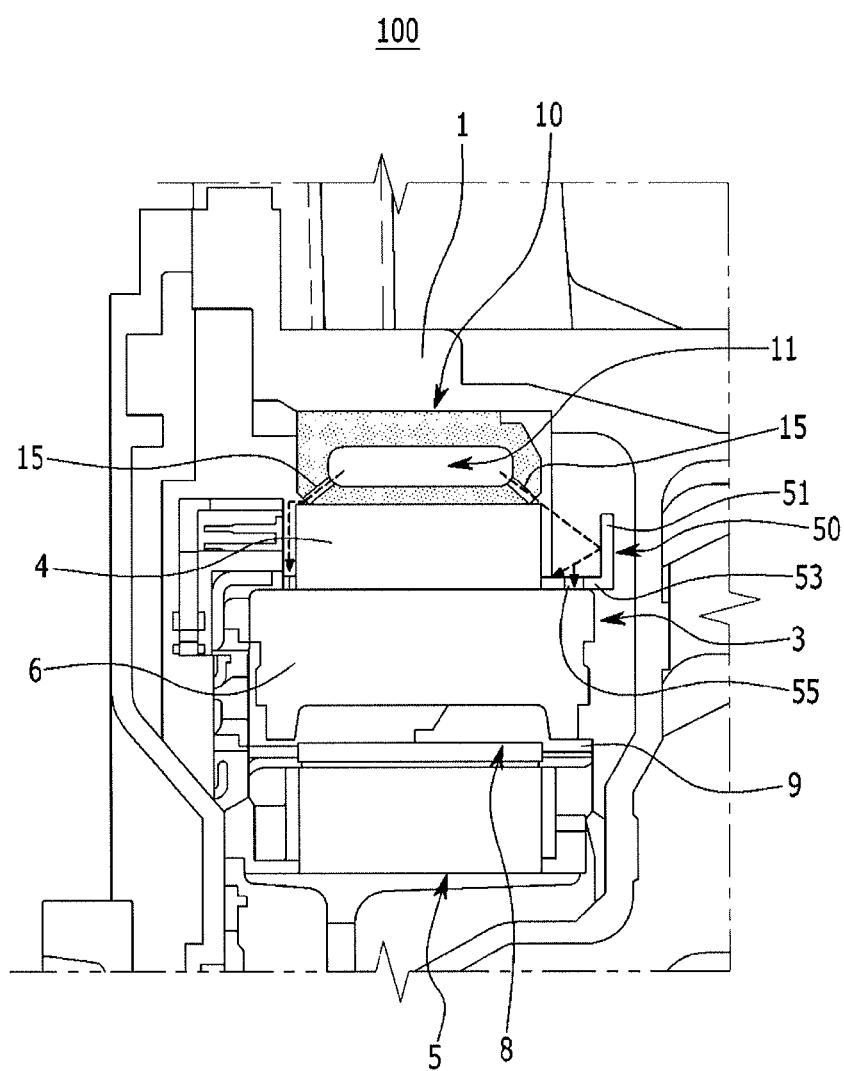
FIG. 4 is a view illustrating the operation of the cooling structure of a drive motor according to an exemplary embodiment of the present invention.

FIG. 4 is a view illustrating the operation of the cooling structure of a drive motor according to an exemplary embodiment of the present invention.

Referring to FIG. 4, in an exemplary embodiment of the present invention, first, the support member 10 is fitted on the inside of the housing 1 and the stator core 4 of the drive motor is fitted on the inside surface of the support member 10 by shrink-fitting, so the stator core 4 can be firmly supported and fixed in the housing 1 by the support member 10.

The stator coil 6 of the stator 3 generates heat while the drive motor is operated and the heat transfers to the housing 1 through the stator core 4 and is then dissipated. Further, in an exemplary embodiment of the present invention, since the channel 11 is formed in the support member 10, the cooling oil flows through the channel 11 and the drive motor can be cooled by discharging heat through the cooling oil.

In this process, in an exemplary embodiment of the present invention, some of the cooling oil flowing through the channel 11 of the support member 10 is sprayed to both sides of the stator core 4 through the nozzle holes 15.

Accordingly, the cooling oil flows to the stator core 4 and the stator coil 6, so the heat transferring to the stator core 4 from the stator coil 6 is dissipated and the stator 3 is cooled.

Further, in an exemplary embodiment of the present invention, the cooling oil sprayed from the nozzle holes 15 of the support member 10 can be guided to the stator coil 6 through the guiding portion 50 of the bobbin 8.

The cooling oils sprayed from the nozzle holes 15 is blocked by the blocking portion 51 of the guide 50 and flows down to the guiding portion 53, and is then guided to the stator coil 6 by the curved guiding surface 54 and the guiding hole 55 of the guiding portion 53.

Therefore, according to the cooling structure 100 of a drive motor of an exemplary embodiment of the present invention, it is possible to supply the cooling oil flowing through the channel 11 of the support member 10 directly to the stator 3 through the nozzle holes 15 of the support member 10 and the guide 50 of the bobbin 8.

Accordingly, in an exemplary embodiment of the present invention, it is possible to directly cool the stator core 4, and the stator coil 6 of the stator 3 using the cooling oil, so is possible to more efficiently cool the drive motor.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "interior", "exterior", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A cooling structure of a drive motor, including
a ring-shaped support member disposed on an inside of a housing and supporting a stator core of the drive motor,
wherein the support member has a channel for cooling oil flow therein and nozzle openings for spraying the cooling oil to the stator core and a stator coil wounded around the stator core,
wherein the nozzle openings are formed toward a first side and a second side of the stator core in the channel, and
wherein the nozzle openings are formed at a portion connecting an inside surface and a first side and a second side of the support member, respectively, and circumferentially spaced from each other with predetermined intervals.

2. The structure of claim 1, whereinthe nozzle openings are inclined toward the first side and the second side of the stator core at the portion connecting the inside surface and the first side and the second side of the support member.

3. A cooling structure of a drive motor, including
a ring-shaped support member disposed on an inside of a housing and supporting a stator core of the drive motor,
where the support member has a channel for cooling oil flow therein and nozzle openings for spraying the cooling oil to the stator core and a stator coil wounded around the stator core, and
a guide formed on a bobbin supporting the stator coil and guiding the cooling oil sprayed from the nozzle openings to the stator coil.

4. The structure of claim 3, wherein the guide has:
a blocking portion disposed adjacent to the nozzle openings of the support member and blocking the cooling oil sprayed from the nozzle openings, and
a guiding portion integally connected to the blocking portion and guiding the cooling oil blocked by the blocking portion to the stator coil.

5. The structure of claim 4, wherein the guide has an L-shaped cross-section.

6. The structure of claim 4, wherein the guiding portion is horizontally connected to a body of the bobbin, and
the blocking portion is vertically connected to the guiding portion.

7. The structure of claim 4, wherein the guiding portion has a curved guiding surface for guiding the cooling oil blocked by the blocking portion to the stator coil.

8. The structure of claim 7, wherein the guiding portion has a guiding opening exposing the stator coil and guiding the cooling oil to the stator coil.

9. The structure of claim 3, wherein the nozzle openings are formed at a portion connecting an inside surface and a first side and a second side of the support member, respectively, and circumferentially spaced from each other with predetermined intervals.

10. The structure of claim 9, wherein the nozzle openings are inclined toward a first side and a second side of the stator core at the portion connecting the inside surface and the first side and the second side of the support member.

* * * * *